Aug. 18, 1925. 1,550,297
P. F. WILLIAMS
TIRE RIGGING
Filed Oct. 16, 1920
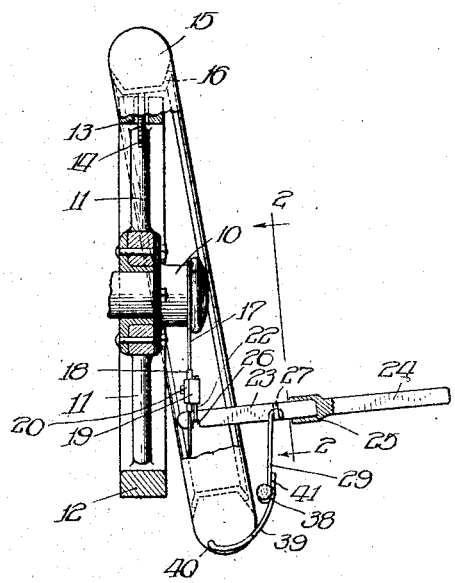
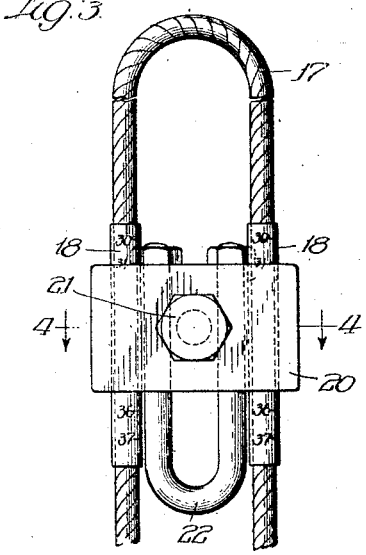
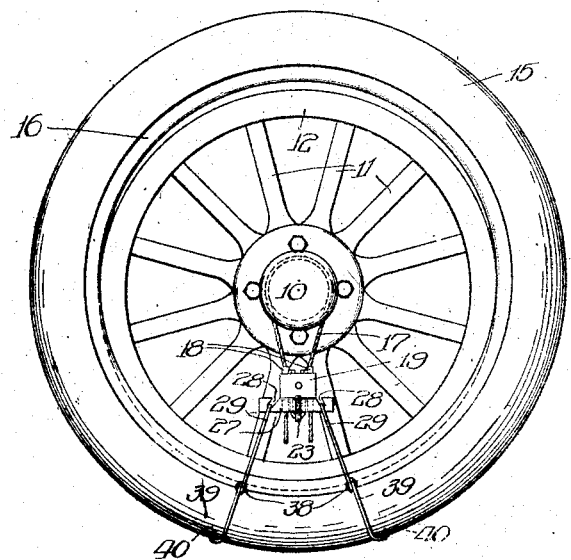
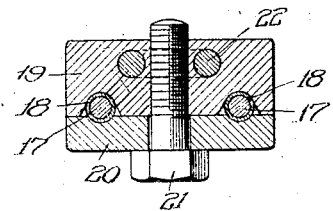
Inventor:
Paul F. Williams
By Wilkinson, Huxley, Byron & Knight
attys.
Witness:
R. Burkhardt Patented Aug. 18, 1925.

1,550,297

UNITED STATES PATENT OFFICE.

PAUL F. WILLIAMS, OF WINNETKA, ILLINOIS, ASSIGNOR TO G. & W. ELECTRIC SPECIALTY CO., OF CHICAGO, ILLINOIS, A CORPORATION OF ILLINOIS.

TIRE RIGGING.

Application filed October 16, 1920. Serial No. 417,440.

*To all whom it may concern:*

Be it known that I, PAUL F. WILLIAMS, a citizen of the United States, residing at Winnetka, in the county of Cook and State of Illinois, have invented certain new and useful Improvements in Tire Rigging, of which the following is a specification.

This invention relates to a tire rigging particularly adapted for lifting a tire to apply or withdraw same from a wheel, such as a motor vehicle wheel.

Automobile and motor truck tires are heavy and cumbersome, and at best under ordinary conditions are rather difficult to handle in applying and withdrawing same from a wheel. Not only is such work burdensome, but also one's clothes become soiled in attempting to steady the tire and wheel as the former is applied, it being understood that the wheel under these conditions is jacked up and usually free to rotate. Furthermore, it is common experience to injure or ruin valve stems in applying or withdrawing tires from the wheels.

One object, therefore, of my present invention is to overcome in a simple and efficient manner the above-mentioned difficulties and objectionable features.

Another object is to provide a tire rigging easy to control, simple and light in structure, arranged to be reduced to a small package when not in use, and having relatively adjustable parts to accommodate wheels and tires of different sizes and shapes.

Another object is to provide a tire rigging for applying tires to and withdrawing same from wheels in a manner to meet successfully all requirements for the particular use.

These and other objects are accomplished by means of the tire rigging shown on the accompanying sheet of drawings, in which—

Figure 1 is an elevational view of my tire rigging illustrating its use in applying and withdrawing a pneumatic tire from a motor vehicle wheel;

Figure 2 is another elevational view of the same arrangement, the lever being shown in section in the plane of line 2—2 of Figure 1;

Figure 3 is a fragmentary detail view of the tire rigging;

Figure 4 is a sectional view taken in the plane of line 4—4 of Figure 3;

Figure 5 is a fragmentary side elevation of a plurality of pivotally connected links forming a part of the tire rigging; and, Figure 6 is a fragmentary front elevation of the same.

The various novel features of my invention will be apparent from the following description and drawings and will be particularly pointed out in the appended claims.

Referring to the figures of the drawings, it will be noted that my invention is illustrated in connection with a motor vehicle wheel including a hub 10, spokes 11 and felly 12, the latter of which is provided with the usual opening 13 for the reception of a valve stem 14 of a pneumatic tire 15 which is applied to and withdrawn from the tire by means of my tire rigging. As shown, the pneumatic tire 15 is mounted on a metal rim 16, the two being applied as a unit to the wheel.

As illustrated, the tire rigging preferably, although not necessarily, includes a flexible member 17 which may be looped over or secured to the hub 10 of the wheel, it being understood, of course, that if desired this flexible member 17 may be secured to the spokes or to any other portion of the wheel. Preferably mounted on this flexible member 17 and rigidly secured thereto are sleeves 18 which normally are secured between two clamping plates 19 and 20, which are releasably secured to each other by a clamping screw 21. The sleeves 18 are provided with graduations to indicate the proper adjustment of same within the clamping plates 19 and 20 for use in connection with different size wheels and tires, the graduations, 30 to 37, inclusive, corresponding to the usual range of tire diameters. Also secured to the clamp plate 19 is a U-shaped member 22 which acts as a fulcrum for a lever or power applying member, which preferably is arranged in two demountable sections 23 and 24, the same being connected by any suitable joint 25. Preferably the lever section 23 is provided with a notch 26 for receiving the fulcrum member 22. The tire engaging means is suspended from the lever means and in this case from section 23 thereof. Preferably the lever section 23 is provided with a cross piece 27 having notches 28 for the pivotal reception of links 29, to the lower end of each of which is pivotally connected, by a pin or rivet 38, a tire engaging member 39, the lower portion of each of which is looped for receiving the tire and terminates in an enlarged portion 40 for assisting in retaining the tire thereon. The links 29 are pivoted with respect to the cross bar 27 and otherwise loose in the slots 28 thereof whereby the tire engaging members may be adjusted toward and from each other, as desired. Preferably each of the tire engaging members 39 is provided with upstanding portions 41 for engaging the associated link 29 for limiting relative movement therebetween in a given direction and retaining each of the tire engaging members in proper tire receiving position.

From the arrangement thus described, it is apparent, with particular reference to Figures 1 and 2, that the tire 15 and rim 16 as a unit may be raised from the position shown for withdrawing same from the wheel, and also may be raised for the purpose of applying the tire and rim to the wheel with the exertion of little energy and in a simple and efficient manner without causing injury to the valve stem, it being appreciated that the applying and withdrawing movement of the tire may be slow and controlled, permitting careful movement of the valve stem through its receiving opening 13 in the felly 12.

It is evident that there may be various modifications of the invention herein particularly shown and described, and it is my intention to cover all such modifications which do not involve a departure from the spirit and scope of the following claims.

I claim:

1. A tire rigging for applying a tire and its metal rim to and withdrawing same from a wheel comprising wheel-engaging means, tire-engaging means in which the tire is slung, and means cooperating with said wheel-engaging means and tire-engaging means through which power is applied to lift the tire and its rim as a whole both in applying and withdrawing the latter.

2. A tire rigging for applying a tire and its metal rim to and withdrawing same from a wheel comprising tire-lifting means adapted to be suspended from a portion of the wheel for lifting the tire and rim as a whole both in applying and withdrawing same.

3. A tire rigging for applying a tire and its metal rim to and withdrawing same from a wheel comprising a hub-engaging member, a tire-engaging member in which the tire is slung, and a lever connected to said hub-engaging and tire-engaging members for lifting the tire and its rim as a whole both in applying and withdrawing the same.

4. A tire rigging for applying a tire to and withdrawing same from a wheel comprising a supporting member adapted to be slung from a portion of the wheel and having a lever-supporting portion adjustable vertically with respect thereto for use in connection with wheels and tires of different sizes and tire-engaging means associated therewith.

5. A tire rigging for applying a tire and its metal rim to and withdrawing same from a wheel including a slung lever-supporting member, and wheel-engaging means, there being a relative graduated adjustment between said lever-supporting means and wheel-engaging means for determining the adjustment to be used for wheels and tires of different sizes.

6. A tire rigging for applying a tire and its rim to and withdrawing same from a wheel comprising a member slung from a portion of the wheel, a lever connected to said member, and tire-engaging means suspended from said lever.

Signed at Chicago, Illinois, this 7th day of October, 1920.

PAUL F. WILLIAMS.